United States Patent Office

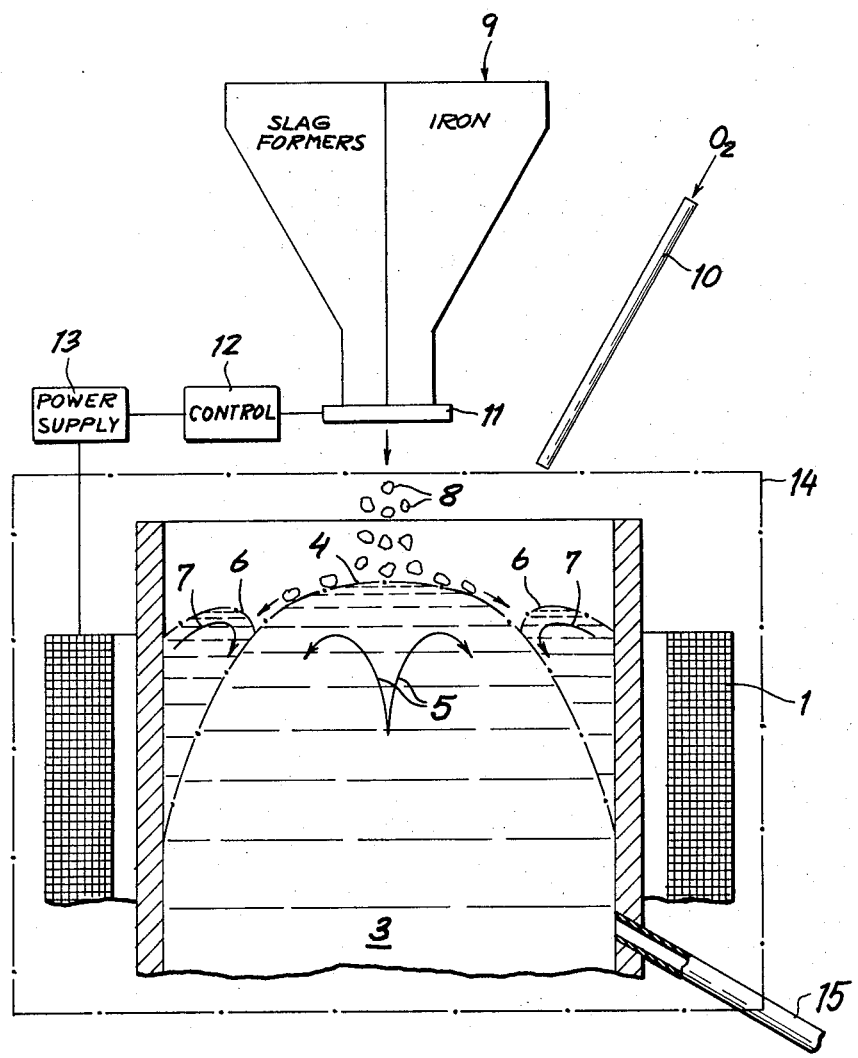

3,827,877
Patented Aug. 6, 1974

3,827,877
METHOD OF INDUCTION-REFINING A FERROUS MELT USING A SPONGE IRON CHARGE
Heinz-Dieter Pantke, Essen-Frintrop, and Ulrich Pohl, Oberhausen-Osterfeld, Germany, assignors to Huttenwerk Oberhausen AG, Oberhausen, Germany
Continuation-in-part of application Ser. No. 228,406, Feb. 22, 1972, which is a continuation of application Ser. No. 879,459, Nov. 26, 1969, both now abandoned. This application Oct. 2, 1972, Ser. No. 294,436
Claims priority, application Germany, Nov. 29, 1968, P 18 11 703.8
Int. Cl. C21c 5/52; H05b 5/12
U.S. Cl. 75—12                                    4 Claims

ABSTRACT OF THE DISCLOSURE

The crucible of an induction furnace is surrounded by an upright coil that is energized by alternating-current electric power. The power input to the coil is of such a level that a raised, slag-free crown is formed on the top of the melt and at least 55% of the slag produced is retained to form an annulus around this crown. The centrally ascending and peripherally descending currents in the ferrous melt cause the crown to form and also induce the annulus to introvert (circulate inwardly and downwardly) so that light sponge iron added to the melt is drawn downwardly into the slag-steel interface and quickly heated and brought into intimate contact with both floating slag and the ferrous melt. The power is fed to the coil in a magnitude determined by the relationship $$P > K\sqrt{f}$$

wherein $P$ is the power input in kilowatts per ton of the melt, $K$ is the annulus-forming constant and is greater than 45 and preferably more than 49.5, and $f$ is the frequency in Hz. of the alternating current.

1. Cross Reference to Related Applications

The present application is a continuation-in-part of application Ser. No. 228,406 filed Feb. 22, 1972 (now abandoned) as a continuation of application Ser. No. 879,459 filed Nov. 26, 1969 and now abandoned.

2. Field of the Invention

The present invention relates to a method of incorporating light-weight additives in a ferrous melt and, more particularly, to a steel-making refining process which employs a crucible-type induction furnace and a sponge-iron charge.

3. Background of the Invention

A crucible-type induction furnace generally comprises a crucible surrounded by an electric coil which is energized by high-energy alternating current. An electromagnetic field is thus produced which generates eddy currents in the charge in the crucible to heat and melt the charge. In the case of a ferrous melt, the field has a radially inwardly acting component which displaces the charge so that a stirring and convective current is developed which rises at the center of the melt and descends at the sides thereof. A furnace of this type has been proposed for the addition of substances to a steel melt at a slag-free crown, the major part and preferably all of the slag being removed from the charge.

Such a furnace has never been successfully applied, however, to the large-scale smelting and refining of steel from high-purity sponge iron as is produced, for example, by the direct gas reduction of iron ore. Such furnaces have been proposed for the smelting and refining of scrap or the heating of liquid metals from other sources. Lightweight low-density or low specific gravity metals and nonmetallic or nonconductive materials, e.g. slag formers, sponge iron, light alloying metals and compounds and other refining additives and reactants, are not sufficiently heated because of high porosity, lack of intimate contact with the liquid phase and the low density, and merely lie on the slag topping the melt in the absence of a crown or upon the surface of the latter in spite of the dynamic or circulating movement thereof. It is, for example, virtually impossible to melt sponge iron in a conventional induction furnace.

A solution to the above problem has been the additional use of such means as a plasma burner above the melt to heat and melt any lighter elements added from above and floating on the melt. This answer to the problem, however, requires the installation of additional apparatus with added cost and problems.

4. Objects of the Invention

It is, therefore, an object of the present invention to provide an improved method of treating ferrous melts, especially steel.

More specifically, it is an object of the present invention to provide such a method which makes possible the large-scale refining and production of steel with an induction furnace overcoming the above-described disadvantages and enabling the use of sponge iron as the charge to be refined.

Another object of the instant invention is to provide an improved method of adding solid materials to a ferrous-metal melt which will bring the solid phase and the liquid phase into intimate contact at a high rate, thereby enabling rapid heating of the lightweight and normally floating materials as well as early reaction between the phase at their interface.

It is a further object of the invention to provide an improved method of incorporating steel-refining additives in a ferrous melt upon which a layer of slag or other relatively lightweight material is, or has been, formed.

It is still another object of the invention to provide an improved method of melting sponge iron which eliminates the need for plasma burners and auxiliary heating means and which enables sponge iron to contact all parts of the charge of a steel-making installation without disadvantages generally accompanying the low-density and high heat-dissipation rate of sponge iron.

5. Summary of the Invention

The invention is based on the surprising discovery that the above-mentioned inductive, electrodynamic stirring of the melt can be advantageously employed to overcome many of the disadvantages. This stirring action has been considered an interesting but relatively useless characteristic of induction furnaces. The amount of electric power needed to heat and melt the charge adequately, generally less than 250 kw./ton of melt, produces only a minor stirring of the melt.

An essential feature of this invention resides in a method of incorporating solid materials into a ferrous melt, this method comprising the steps of electrodynamically stirring a ferrous melt (e.g. the melt in a steel-refining furnace), forming an introverting annulus of slag at the top of the melt around a slag-free crown so that the flanks of the crown descend outwardly while the inner portion of the slag annulus curls inwardly in a vortex-like action, and depositing the solid materials on the slag-free crown so that they are entrained between the flanks of the crown and the introverting slag, thereby passing into intimate surface contact with both the slag and the furnace melt. The specific power (i.e. power per unit weight of charge) must be sufficient to raise the crown while at least 55% of the slag produced must be retained during refining, i.e. at least 55% of the slag present and generated from each furnace-operating cycle must be retained during the next operating cycle.

When the solid phase is sponge iron, i.e. the highly porous, lightweight, high-purity product of the direct gas reduction of iron ore, the normal tendency of the sponge iron to float upon the surface of the melt is countered by the forcible entrainment of the slag between the outwardly descending flanks of the crown and the inwardly and downwardly curling flanks of the slag annulus to sandwich the sponge iron between slag and ferrous melt.

As a consequence, the iron is drawn rapidly downwardly and into the body of the melt so that it cannot dissipate the heat transferred to it and it is rapidly smelted or dissolved in the ferrous portion of the liquid face.

Furthermore, the intimate contact of the freshly added iron with the slag of the annulus and any slag which may be entrained into the body of the ferrous phase, results in a substantially instantaneous reaction between the slag and the freshly smelted iron as the latter is added or shortly thereafter. Thus, practically all of the newly added, unrefined iron (essentially sponge iron) is refined into steel without delay and a more or less continuous process may be practiced.

In accordance with this aspect of the invention, therefore, refined steel may be tapped from the ferrous phase of the crucible of the induction furnace while a corresponding quantity of sponge iron is continuously added at the raised crown of the charge in the furnace, preferably together with additional slag-forming materials and additives. Instead of continuous addition and withdrawal of charge and refined metal, an intermittent discharge and charge process may be employed.

In this connection it has been found to be important to retain at all times 50-60% of the melt capacity of the crucible in the latter, while the balance of the metal charge may be tapped off, thereby retaining a body in which the electrodynamic stirring can be sustained in the manner previously described. Only the remainder of the melt is drawn off after a preceding refining cycle and the crucible contains 50-60% by weight of its original capacity of the molten metal and any residual slag in the form of an introverting annulus.

As previously described, sponge iron and any slag formers necessary are metered gradually onto the slag-free crown with compensating increase in the induction power to maintain the stirring and heating.

It is thus a feature of the present invention that the power input to the induction furnace is of such a level that a slag-free crown is formed on the upper surface of the melt and rises well above the edges of the melt so that the slag forms its inverting or introverting annulus around this crown. Since the high power makes for a rapidly moving, centrally rising and peripherally descending current in the melt, this annulus introverts continuously inwardly, in contact with the descending flanks of the crown. The introversion causes any additive to the melt, cast upon the slag-free crown, to be drawn into the interface between the essentially nonconductive slag and the ferrous melt where it is brought into an excellent initimate contact with the molten steel some portions of the slag actually being entrained by the current into the body of the melt. In this manner, any lighter-than-steel materials can be readily melted or dissolved by the molten steel since they will not remain atop the slag where they otherwise might fail to pick up sufficient heat. In the same manner, the molten steel continuously contacts the slag across a conitnuously changing interface so that the dephosphorizing or desulphurizing additives can easily accomplish their functions.

According to an essential feature of the present invention, the alternating-current electric power is applied the induction coil of the furnace at such a level that the following critical relationship applies:

$$\frac{P}{\sqrt{f}} = K$$

wherein P is the applied electric power in kilowatts per ton of melt, $f$ is the frequency of the power in Hz., and K is the annulus-forming constant or electrodynamic-storing criticality factor and is larger than the essential minimum value of 45 and preferably larger than 49.5. In this manner, using 50 Hz. alternating current, at least 350 kw./ton electric power must be employed, although preferably 400 kw./ton is used.

According to another feature of the invention, the additives are charged into the crucible atop the slag-free crown and thence drawn into the melt-slag interface. Moreover, it is found that only a part of the melt, e.g. 40 to 50%, should be drawn off as molten steel to be replaced with sponge iron in equivalent amount, the slag being discharged whenever it tends to cover the crown of the ferous melt. Means is provided to regulate the power input to the furnace in dependence upon the dimensions of the charge therein.

As noted, the slag is removed whenever it forms such a thick layer that it is likely to cover the entire top of the melt, including the top of the raised crown. In this covered condition additives such as slag formers, iron ore, or sponge iron cannot be charged directly onto the molten steel.

We have found that it is essential for the purposes of the present invention that, during the refining process, there should be retained in the crucible at least 55% of the slag produced from the refining of a full metal charge therein. Thus, at the start of a subsequent refining operation, there is retained in the crucible at least 55% by weight or volume of the slag originally present and formed in the previous operation of the furnace. Additional slag will then form in the subsequent operation and may be continuously drawn off or retained or drawn off in increments as long as the slag layer does not completely cover the crown. We have also found that there is a critical basicity value of the slag which should be maintained to provide the desired viscosity and phosphorus-removal efficacy as described below.

6. Specific Example

A coreless induction furnace with capacity of 1000 kg. of steel, as described at page 7—93 of *Mark's Mechanical Engineers' Handbook*, McGraw-Hill Book Company, 1958, is charged to capacity with steel scrap to which limestone and silica slag formers have been added.

After initial smelting, the charge is brought to a temperature above the melting point and heated at a final power of 400 kw. (400 kw./ton) with 50 Hz. alternating current. 55% of the charge, and all of the slag, are retained in the furnace and about 45% of the steel is tapped off. The power is reduced to 70% of its original level (i.e. 280 kg. corresponding to 508 kw. per ton of charge). Sponge iron, as made as described in the commonly assigned applications, pending with the parent application thereof, Ser. No. 711,102, Ser. No. 839,451 and Ser. No. 834,065 (filed 6 March 1968, 7 July 1969 and 17 June 1969, now U.S. Pats. 3,511,390, 3,598,257 and 3,591,158, respectively) and the earlier applications mentioned therein, serves as the steel making charge with the usual slag former and is introduced into the partially empty crucible in which electrodynamic stirring is maintained at the indicated power level; the granulated sponge iron is gradually dropped onto the slag-free crown and is drawn between the slag annulus and the descending flanks of the crown. The power is increased gradually to its original level of 400 kw. (400 kw./ton) as the charge is restored to full capacity. The additive to the charge includes about 50 kg. of coke which eliminates residual oxides and any additional coke which is required to bring the carbon content to 0.05%. Limestone is added as a slag former in much smaller amounts, i.e. about 10 kg.

It is noted that refining of the newly added sponge iron occurs substatnially simultaneously with smelting and as soon as the charge reaches 100° of capacity as noted above, the refined steel is partially tapped and the procedure repeated with a minium of 55% of the slag from a previous run being retained for the next run.

7. Description of the Drawing

The above and other objects, features, and advantages will become more fully apparent, reference being made to the sole figure of the accompanying drawing, in which an induction furnace according to the present invention is diagrammatically illustrated, largely in vertical section.

8. Specific Description

The furnace comprises an upright crucible 2 of generally cylindrical shape surrounded by a similarly cylindrical coil 1. The crucible is nonconducting electrically and is preferably composed of a refractory material. Above the crucible is a hopper 9 which can adjustably charge the crucible 2 with slag formers and other additives, and with iron ore, sponge iron, and the like. An oxygen-ejecting lane 10 can, if necessary, be employed to decarburize the melt.

The hoppers 9 have their outputs metered or regulated by a control arrangement 12 which may also be sensitive to the melt temperature. This device 12 is connected to a power supply 13 for the coil to maintain the above-described power ratio. As the size of the melt is increased by addition of material from the hoppers 9, the control arrangement 12 increases the power input to the coil 1.

The entire crucible 2 and coil 1 can be sealed off and evacuated at 14 if desired. Molten steel is tapped through pipe 15 and the entire crucible can be tilted to run off slag or a separate tap may be provided above the surface of the melt for this purpose.

Thus, in a normal running condition of the furnace according to the invention, a body of molten steel 3 has liquid thermal-convective and electromagnetically induced currents 5 forming an axially elevated crown 4 on its upper surface when $$\frac{P}{\sqrt{f}} > 49.5$$

and $P \geqq 350$ kw./ton, for example. Thus, an annular body 6 of slag having introverting currents is formed surrounding this crown. Material 8 is added as necessary by the hoppers 9 to the uncovered raised crown.

In a first stage of steel refinement, the readily oxidizable components of the melt are burned off as they react with components of the slag, the freshly added material, and with the atmosphere, since the central crown 4 is exposed to the atmosphere. At the same time, a reaction between the iron (II) oxide and the phosphorus in the melt, for which reaction the melt must be relatively cool, basic, and have a high oxidation potential, removes this phosphorus from the steel. Subsequently, the sulphur must be removed. For desulphurization the slag must be of a reducing character, relatively low in iron (II) oxide, and of a temperature (both of slag and steel) which is as high as possible.

After initially forming the melt from scrap steel, for example, slag formation commences and smelting of new metal occurs at the bath temperature slightly above the melting point. To obtain effective dephosphorization the melt carbon content is set to a maximum of 0.1% by weight, preferably 0.03% to 0.07% by weight. This can be accomplished by the addition of ore to the melt, directing a jet of oxygen against the melt, or by other known means. The reaction thus produced lowers the phosphorus content of the melt. Then the refining slag is run off to the extent it exceeds, taking into consideration later-formed quantities of slag, the minimum of 55% for retention previously set forth.

Subsequently the melt is recarburized by simultaneously heating it and supplying the necessary additives. Basic oxides are also added to desulphurize the melt as it is being heated and recarburized. Once the steel attains its intended composition or the desired state of equilibrium, the crucible can be capped and evacuated to stop the reaction.

Advantageously, only 40% to 50% of the steel is drawn off, leaving all the original slag and 50 to 60% of the steel for the next batch, at this level, the power at the coil is 70 to 78% of capacity as adjusted to compensate for the reduced charge.

As mentioned above, it is important to adjust the quantity of slag so that the steel itself is bared at the raised crown. In addition, the aforestated minimum quantity of slag must be retained if the vital slag/metal interface and the osculation between introverting slag and extroverting metal are to trap and hold the charge for the necessary time. In this manner sponge iron can be charged onto the uncovered crown in powdered, granulated, or lump form and is drawn by the currents 7 and 5 into the interface between the melt and the slag where it is completely surrounded by very hot material and rapidly melted. It is important that the power input to the heating coil be increased as new material is added, allowing for the normal smelting exothermic reactions. Slag formers (limestone and siliceous materials) are added along with the sponge iron. Obviously, once the layer of slag develops to the point that it covers the raised crown, a portion of it is run off.

According to another variation of the method, one wherein a minimal amount of slag is produced, only about half of the intended quantity of sponge iron is added to the melt, without any dephosphorizing slag formers. Whatever slag is formed is run off, then the rest of the sponge iron is added along with basic oxides which form slag, the manganese content being so chosen that the slag formed thereby just suffices to take up enough phosphorus to set the proper phosphorus content in the finished steel. This slag may be retained for the next charge.

Of course, alloying materials can be added just prior to tapping to produce whatever exact composition in the steel is desired.

9. Comparative Example

The following comparative example is intended to demonstrate the criticality of the aforementioned power limitation in rendering the system of the present invention capable of processing such lightweight materials as sponge iron by contrast to relatively dense particles or bodies as have been processed heretofore in induction furnaces. It will be recalled that the improvement constituting the present invention derives from the use of a certain minimum energy so that a crown of sufficient height is created and the use of a minimum slag level to ensure the proper duration of contact at the interface into which the sponge iron is drawn. The slag layer should also be of a certain viscosity to ensure that it will remain an introverting layer, this being controlled in part by regulating its basicity.

More specifically, the invention is designed to refine (desulfurize and/or dephosphorize and/or decarbonize) an iron melt into which a charge of sponge iron is introduced. The sponge iron charge has a particle size of 1 to 30 mm., a porosity of 50 to 60%, a bulk density (including pores) of about 3 g./cm.$^3$ and contains small quantities of silicon dioxide, calcium oxide, magnesium oxide, aluminum oxide and titanium oxide in addition to a predominancy of iron and the usual proportions of phosphorus, carbon and sulfur. Slag has a specific gravity of 3.5 to 4.5 g./cm.$^3$ and liquid steel a specific gravity of 7 g/cm.$^3$. The heat conductivity of the iron sponge is only one sixth to one fifth that of steel. In the absence of a substantial slay layer, particles of sponge iron as thus described do not obtain sufficient contact, when deposited on the surface of the melt, to become assimilated into the latter in an efficient manner. The presence of a substantial slag proportion is therefore essential.

In a 2-ton induction crucible furnace with a normal operating power of 800 kw. at a frequency of 50 Hz. (corresponding to 400 kw./t.), sponge iron made from the direct gas reduction of Itabira ore pellets is refined to reduce the sulfur, phosphorus and carbon levels.

The chemical composition of the sponge iron is:

| | | |
|---|---|---|
| Iron | by weight | 92.5 |
| Silicon dioxide | do | 2.08 |
| Calcium oxide | do | 1.65 |
| Magnesium oxide | do | 0.18 |
| Aluminum and titanium oxides | do | 1.04 |
| Sulfur | do | 0.003 |
| Phosphorus | do | 0.031 |
| Carbon | do | 0.70 |
| Density (including pores) | g./cm.$^3$ | 2.9 |
| Particle size | mm | 1 to 15 |

The basicity B of the slay was adjusted to 1.4 by the addition of burned lime, the latter consisting of the slagging medium. The basicity is defined as $$B = \frac{\text{Percent CaO} + \text{Percent MgO}}{\text{Percent SiO}_2 + \text{Percent Al}_2\text{O}_3}$$

It has been found that a basicity of this order of magnitude, e.g. ranging upwardly of 1.2, will provide the desired viscosity and, at the same time, enable the phosphorus level in the melt to be reduced significantly. Tests 1 and 2 below demonstrate this point:

| | Test 1 | Test 2 |
|---|---|---|
| Established electric power, kW/t | 350 | 300 |
| Formation of introverting crown | Good | |
| Temperature of the molten bath, °C | 1,480–1,540 | 1,530–1,580 |
| Electric energy consumption per hour, kWh | 645 | 390 |
| Attained connection time, percent | 75 | 65 |
| Raw steel quantity in melt, kg./h | 1,030 | 530 |
| Slag quantity, kg./t. raw steel | 85 | 110 |
| Yield of metallic product, percent | 99 | 93 |
| Specific power consumption, kWh/t. raw steel | 625 | 740 |
| Analysis, percent: | | |
| C | 0.15 | 0.12 |
| P | 0.015 | 0.027 |
| S | 0.006 | 0.006 |
| Mn | 0.10 | 0.05 |

When the process is carried out without an initial slag layer or when the slag is continuously tapped to remove a predominant proportion, the power consumption per ton of raw steel increases sharply and the process becomes so uncontrollable as to prevent listing in tabular form. This is a consequence of the inability of the sponge iron to assimilate into the melt.

We claim:

1. A method of refining sponge iron to steel comprising the steps of:

(a) continuously refining an iron melt in the presence of slag formers to produce molten steel and a layer of slag thereon in an electric induction crucible furnace;

(b) continuously tapping 50 to 60% of the molten steel of step (a) from said furnace while retaining therein at least 55% of the slag produced in step (a);

(c) continuously inductively heating and electrodynamically stirring the melt remaining in said furnace following step (b) with an alternating-current magnetic field generated by an alternating current applied to said furnace at a power P per ton of the melt, wherein $$K = \frac{P}{\sqrt{f}},$$

$K \geq 45$ and $f$ is the frequency of the alternating current in Hz., to raise an outwardly moving central crown of bare metal on said melt with descending flanks of molten steel inducing said layer of slag into the configuration of a continuously introverting annulus surrounding said crown;

(d) continuously depositing on said raised crown sponge iron in a particle size of 1 to 30 mm. in an amount substantially equivalent to the amount of steel tapped from said melt in step (a) and entraining the sponge iron into the interface between the molten steel and introverting annulus;

(e) refining the sponge iron incorporated into said melt in step (d);

(f) withdrawing slag formed in steps (a) to (e); and (g) charging additives to the steel in said furnace onto said crown subsequent to step (f).

2. The method defined in claim 1 wherein K is $\geq 49.5$.

3. The method defined in claim 1 wherein said power is at least 350 kw./t. of the melt.

4. The method defined in claim 3 wherein said power is at least 400 kw./t. of steel of the melt.

References Cited

UNITED STATES PATENTS

| | | | |
|---|---|---|---|
| 3,579,324 | 5/1971 | Kennedy | 75—10 |
| 1,940,622 | 12/1933 | Clamer | 13—27 |
| 1,838,527 | 12/1931 | Clamer | 13—27 |
| 1,946,873 | 2/1934 | Neuhouss | 75—12 |

L. DEWAYNE RUTLEDGE, Primary Examiner

P. D. ROSENBERG, Assistant Examiner

U.S. Cl. X.R.

13—27; 75—11